US006013905A

United States Patent [19]

Oster

[11] Patent Number: 6,013,905

[45] Date of Patent: Jan. 11, 2000

[54] MAGNETIC VACUUM OVEN WITH SAFE DOOR ACCESS TO AIR GAP

[76] Inventor: Eugene L. Oster, 2042 Bering Dr., San Jose, Calif. 95131

[21] Appl. No.: 09/071,361

[22] Filed: Apr. 30, 1998

[51] Int. Cl.[7] .............................. B23K 13/01

[52] U.S. Cl. .............................. 219/651; 335/302

[58] Field of Search .............................. 219/648, 651, 219/669, 670, 672, 676; 335/300, 302, 303, 304, 305, 306

[56] References Cited

U.S. PATENT DOCUMENTS

| | | | |
|---|---|---|---|
| 4,237,359 | 12/1980 | Röth et al. | 219/658 |
| 4,810,987 | 3/1989 | Liebthal et al. | 335/302 |
| 5,598,684 | 2/1997 | Aarts et al. | 53/434 |
| 5,788,295 | 8/1998 | Fuss et al. | 292/341 |

*Primary Examiner*—John A. Jeffery

*Assistant Examiner*—Jeffrey Pwu

*Attorney, Agent, or Firm*—The Kline Law Firm

[57] ABSTRACT

A magnetic vacuum oven mounted in a two piece steel magnet core. The two sections of the magnet slide apart on rails to provide easy access to the interior of the machine for maintenance and repair. The magnet core includes a “safe door” that is mounted on an articulated hinge or other hinge mechanism. The safe door provides direct access for product introduction to and removal from a central chamber surrounded by an applied magnetic field. Two electromagnet elements are mounted around the central chamber. One of the electromagnet elements is mounted in the front section of the housing, and one of the electromagnet elements is mounted in the rear section. The coils are separated by a small air gap to allow vacuum evacuation of the interior of the chamber. The magnetic coils are generally rectangular, and are water cooled to maintain a stable temperature when they are drawing power in operation.

20 Claims, 12 Drawing Sheets

"H" Core

"C" Core

Fig. 17a.
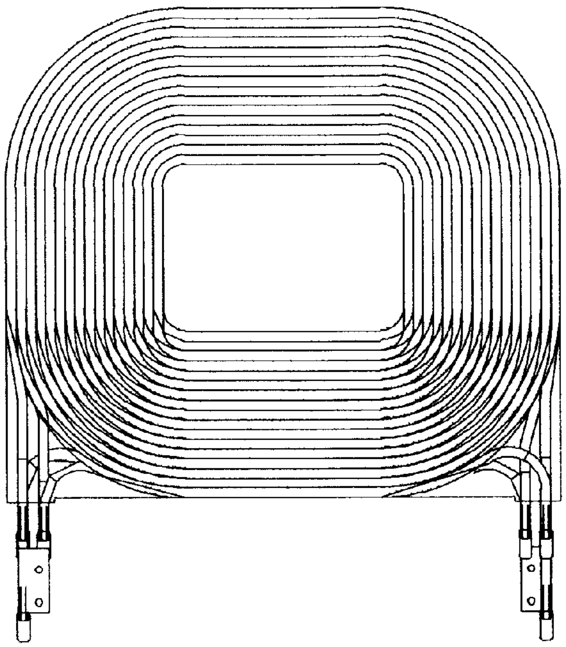
Fig. 17b.
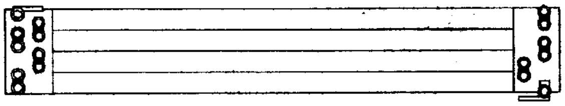
Fig. 17c.

MAGNETIC VACUUM OVEN WITH SAFE DOOR ACCESS TO AIR GAP

FIELD OF THE INVENTION

The present invention relates generally to magnetic vacuum ovens, and more particularly is a magnetic vacuum oven with a high magnetic efficiency adapted for use in read/write head fabrication.

BACKGROUND OF THE INVENTION

Magnetic Vacuum Ovens (MVO's) have become essential tools in the manufacture of devices such as read/write heads for rigid media storage devices. Annealing is usually required at multiple stages in the manufacturing cycle—the initial plated wafer; the sliced wafer (bar); and the final chip (slider) stages.

The initial practice of placing a permanent magnet into standard laboratory vacuum ovens has several drawbacks:

Field Limitation: At any reasonable air gap, permanent magnets are limited to about 5 KGauss (KG).

Cycle Times: Due to the large mass of the permanent magnets, the desired 3–4 hour cycle times must often be extended to 12 hours or more.

Temperature Limitation: Permanent magnets will lose their magnetism if heated beyond the Curie point.

It is not usually feasible to place a permanent magnet around a vacuum-oven chamber due to field limitations (approximately 2 KG) imposed by the larger air gaps and high cost of large permanent magnets.

A number of MVO systems have been built with a vacuum-oven chamber in the air gap of "H" (FIG. 1) or "C" (FIG. 2) type electromagnets.

These types of electromagnets provide good air gap access and are quite practical in the 10–12 KG field range. Beyond this, however, saturation problems begin in the pole base, and forcing the system to higher fields becomes impractical in terms of power requirements. See FIGS. 3 and 4.

Tapering of the poles helps greatly but does not solve all problems:

High fields in the range of 20 KG can not be achieved at an efficiency of much better than 70%. (In terms of power—proportional to the square of the current, so that power efficiency is reduced by approximately $0.7^2 \approx 50\%$.)

Tapering of the poles forces an increase in coil "diameter" with a resultant increase in mean turn, electrical resistance, and power.

Saturation of pole corners at high (20 KG) fields forces larger poles in order to maintain reasonable field uniformity.

Field Uniformity is usually defined as angular deviation of magnetic flux lines from those flux lines across the air gap at the pole center. This requirement ranges from 0.5° to 7.0°. Whether circular or rectangular, the pole must always be larger than the required uniformity area. Pole "shimming" may be used to improve field uniformities for a given pole size, but the resultant removal of material from the pole center results in lower fields for a given magnet excitation (Ampere-turns). See FIG. 5.

Obviously, the magnet poles are the root of many problems. Doing away with them entirely has resulted in the development (~1955) of the "window frame" magnet. See FIGS. 6 and 7.

Advantages of the window frame magnets include:

High magnetic efficiencies (93–97% at 20 KG)

Good product in/out access on one end, and good vacuum pump-out, power and instrumentation access on the other.

Exceptionally good field uniformity in the x z plane. (Magnetic fields created by the coils themselves keep flux lines straight.) See FIG. 8.

Disadvantages include:

High Cost

A two axis winding machine is required and 8 bends vs. 4 bends for a "normal" flat coil. Both winding and potting tools are complex and expensive, and the entire process is labor intensive.

High Power

Although magnetically efficient, the mean turn is obviously much longer than a "normal" rectangular coil. Resistance and required power are, therefore, proportionally increased.

Stray Fields

High stray fields are a hallmark of all electromagnets depicted up to this point. The window-frame magnet with saddle coils is especially troublesome in this regard since the coils are unavoidably further back from the air gap surface. See FIG. 9.

Note that in the y z plane, the core width must be larger than the "good field" area due to flux line bowing as we approach the ends, just as with magnets with poles.

It is therefore an object of the present invention to provide a vacuum oven with the capability of applying a strong (20 KG+), uniform electromagnetic field to a workpiece.

It is a further object of the present invention to provide a magnetic vacuum oven with a central chamber accessible through a "safe door" through the magnet core.

It is a still further object of the present invention to provide a magnetic field with minimal stray fields which are deleterious to ancillary equipment, e.g. vacuum gauges, computer monitors, etc.

It is yet another object of the present invention to provide an electromagnet with no poles or with minimal poles. Short poles may be incorporated with lengths limited to the point where decreased magnetic efficiencies (power increase) begin to outweigh the benefit of provided room for coils (more copper or aluminum conductor→lower power requirement). If poles are to be implemented, they should have as large an area to length ratio as possible. The larger the area/length ratio of the poles, the better the performance of the magnet.

It is another object of the present invention to provide separate product and vacuum pumpout/instrumentation access means.

SUMMARY OF THE INVENTION

The present invention is a magnetic vacuum oven mounted in a steel magnet core. The two sections of the core slide apart on rails to provide easy access to the interior of the machine for maintenance and repair. The magnet core includes a "safe door" that is mounted on an articulated hinge or other hinge mechanism. The safe door provides direct access for product introduction to and removal from a central chamber surrounded by an applied magnetic field.

Two electromagnet coils are mounted around the central chamber. One of the coils is mounted in the front section of the housing, and one of the coils is mounted in the rear section. The coils are separated by a small air gap to allow vacuum evacuation of the interior of the chamber.

The magnetic coils are generally rectangular, and are water cooled to maintain a stable temperature when they are drawing power in operation.

An advantage of the present invention is that it provides a vacuum oven with the capability of applying a strong (in excess of 20 KGauss) electromagnetic field to a workpiece at an efficiency of over 95%.

Another advantage of the present invention is that it provides direct access, through a safe door, to a central chamber surrounded by the magnetic field.

A still further advantage of the present invention is that the magnetic field provided has minimal stray fields.

These and other objects and advantages of the present invention will become apparent to those skilled in the art in view of the description of the best presently known mode of carrying out the invention as described herein and as illustrated in the drawings.

BRIEF DESCRIPTION OF THE DRAWINGS

FIGS. 17_a–c_ are front, side, and bottom views respectively of the coils.

BEST MODE OF CARRYING OUT THE INVENTION

Figure 1:
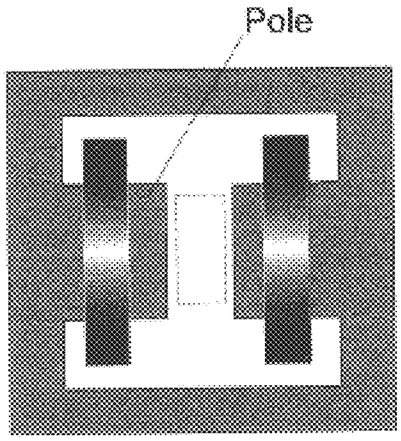
Fig. 1 (Prior Art)
FIG. 1 is a front view of a prior art "H" core electromagnet.
Figure 2:
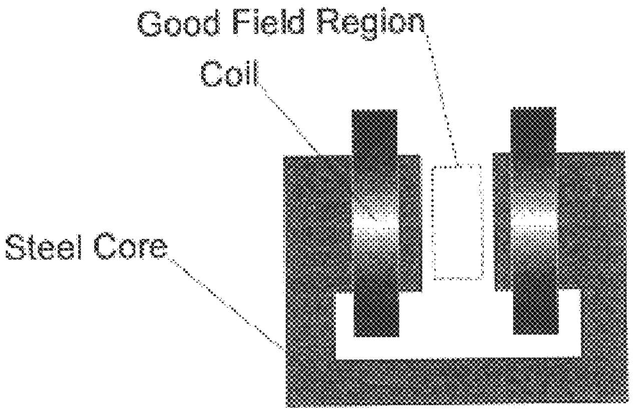
Fig. 2 (Prior Art)
FIG. 2 is a front view of a prior art "C" core electromagnet.
Figure 3:
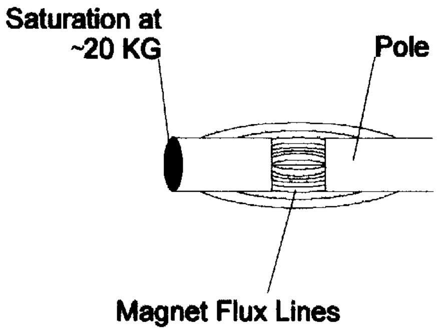
Fig. 3 (Prior Art)
FIG. 3 is an illustration of prior art electromagnet pole saturation problems.
Figure 4:
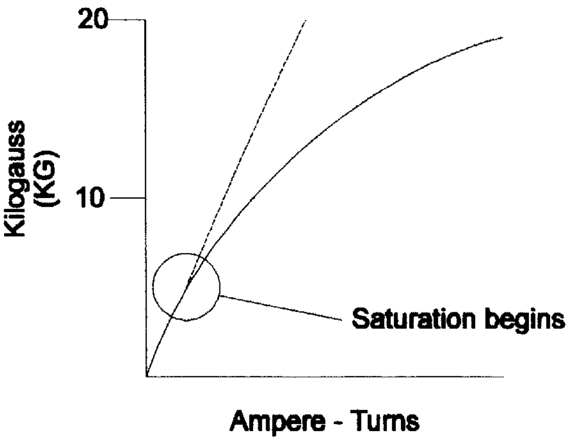
Fig. 4 (Prior Art)
FIG. 4 is a graphical illustration of prior art electromagnet pole saturation problems.
Figure 5:
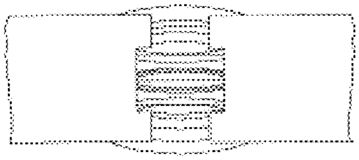
Fig. 5 (Prior Art)
FIG. 5 shows a prior art electromagnet with "shimmed" poles.
Figure 6:
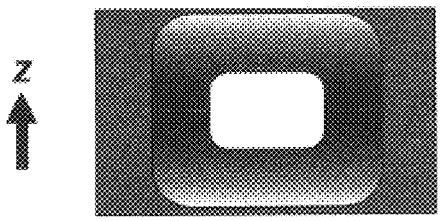
Fig. 6 (Prior Art)
FIGS. 6–9 are views of prior art window frame magnets.
Figure 7:
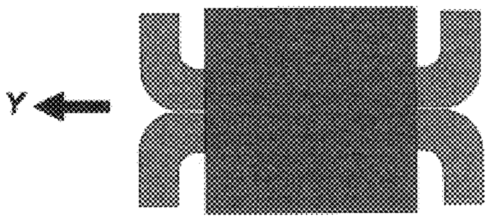
Fig. 7 (Prior Art)
Figure 8:
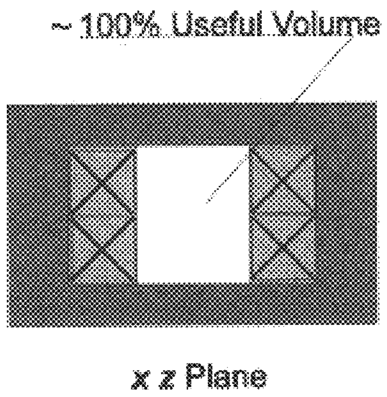
Fig. 8 (Prior Art)
Figure 9:
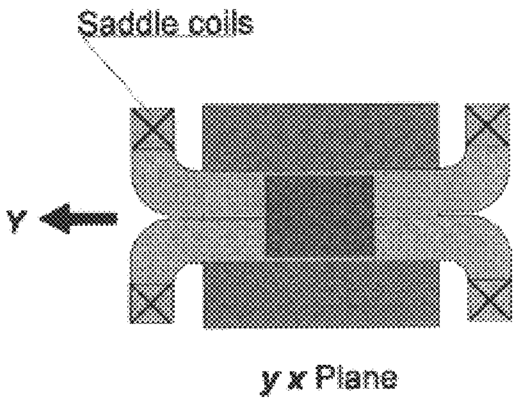
Fig. 9 (Prior Art)
Figure 10:
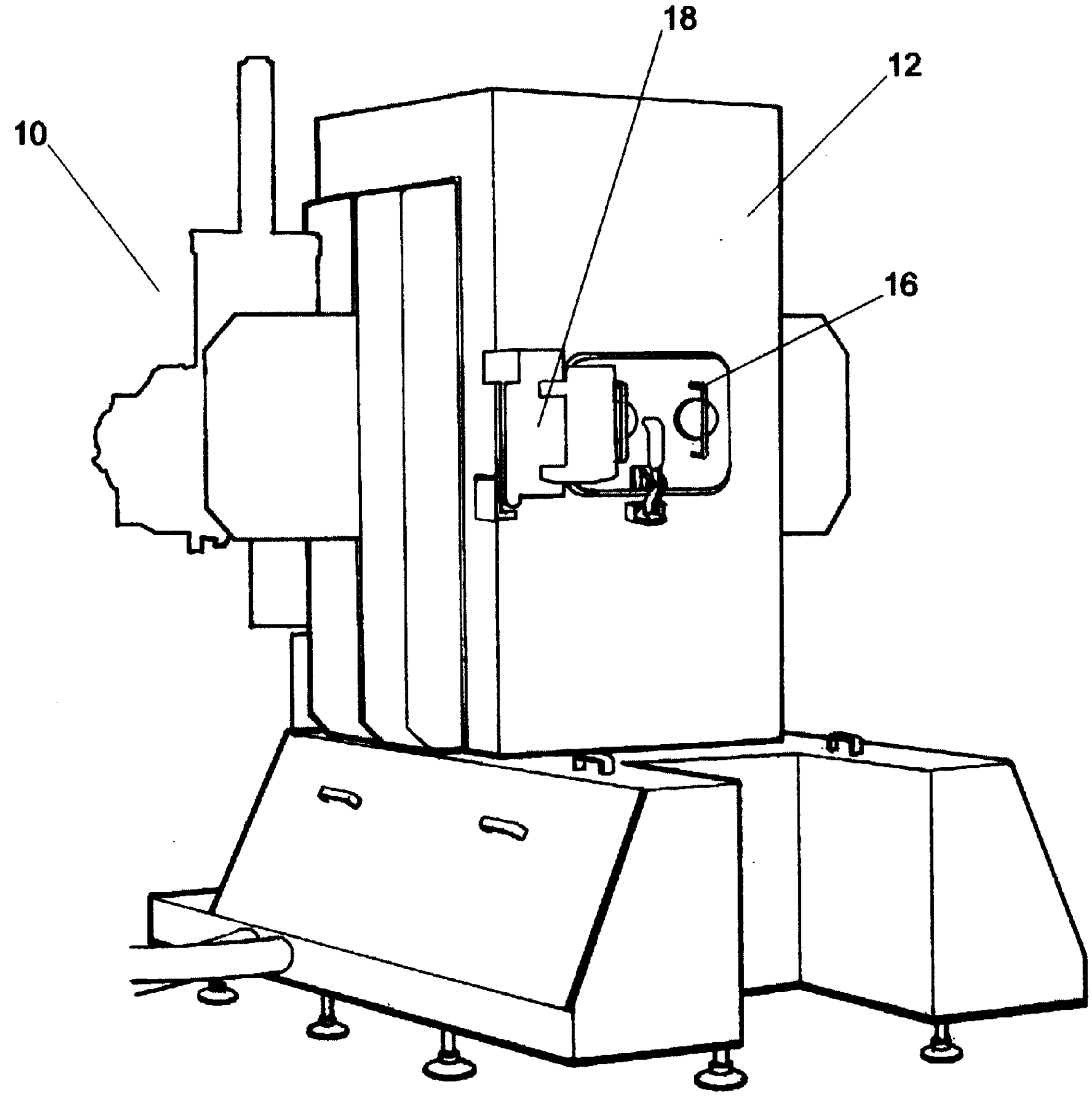
FIG. 10 is a perspective view of the magnetic vacuum oven of the present invention.
Figure 11:
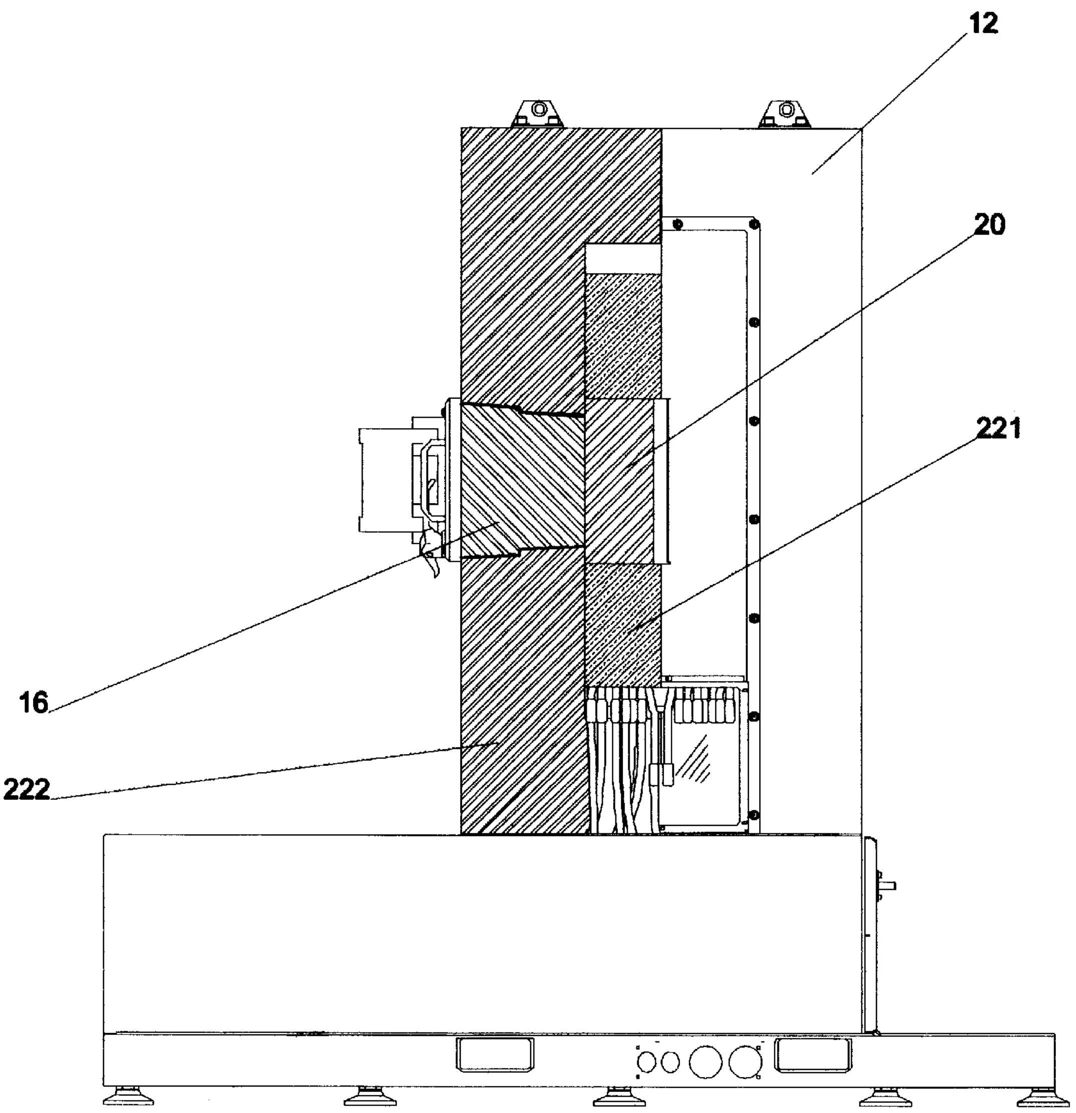
FIG. 11 is a partially sectioned side view of the magnetic vacuum oven.
Figure 14:
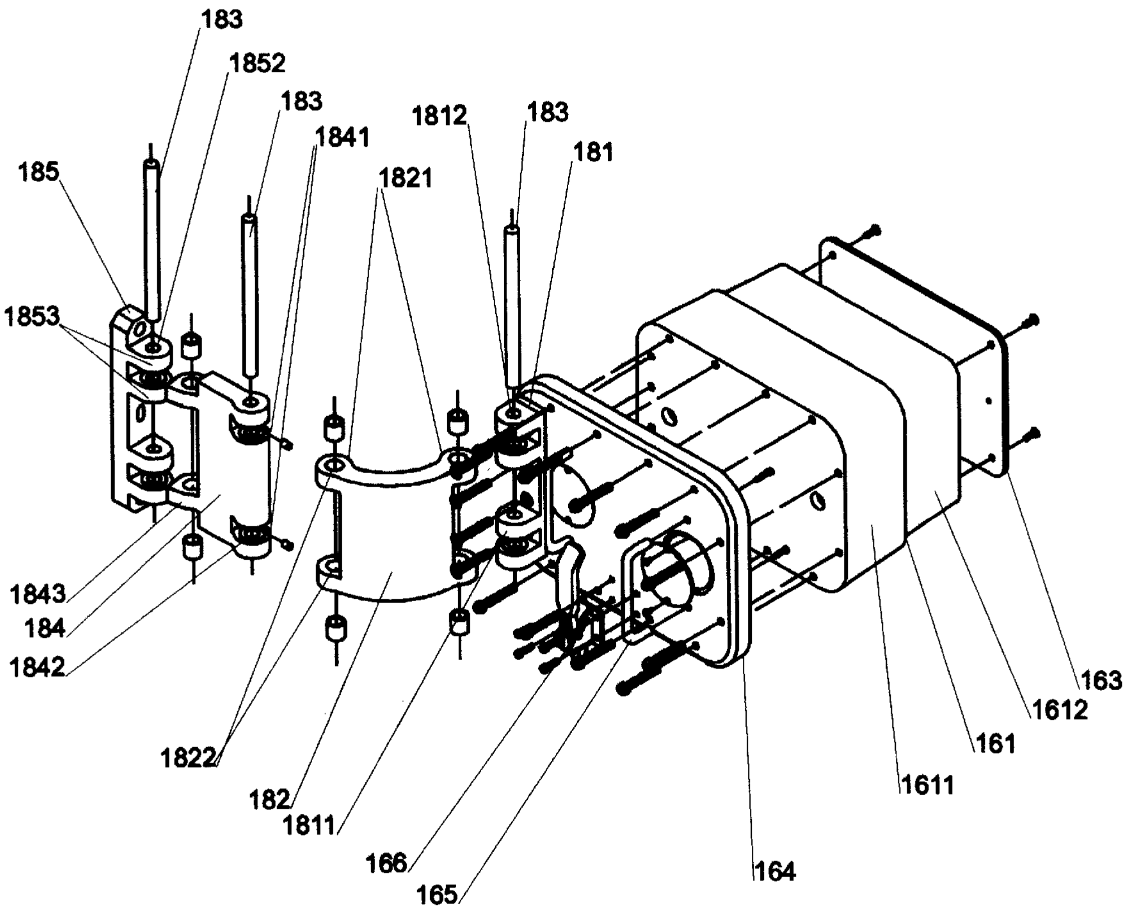
FIG. 14 is an exploded view of the safe door and the articulated hinge arm.
Figure 15:
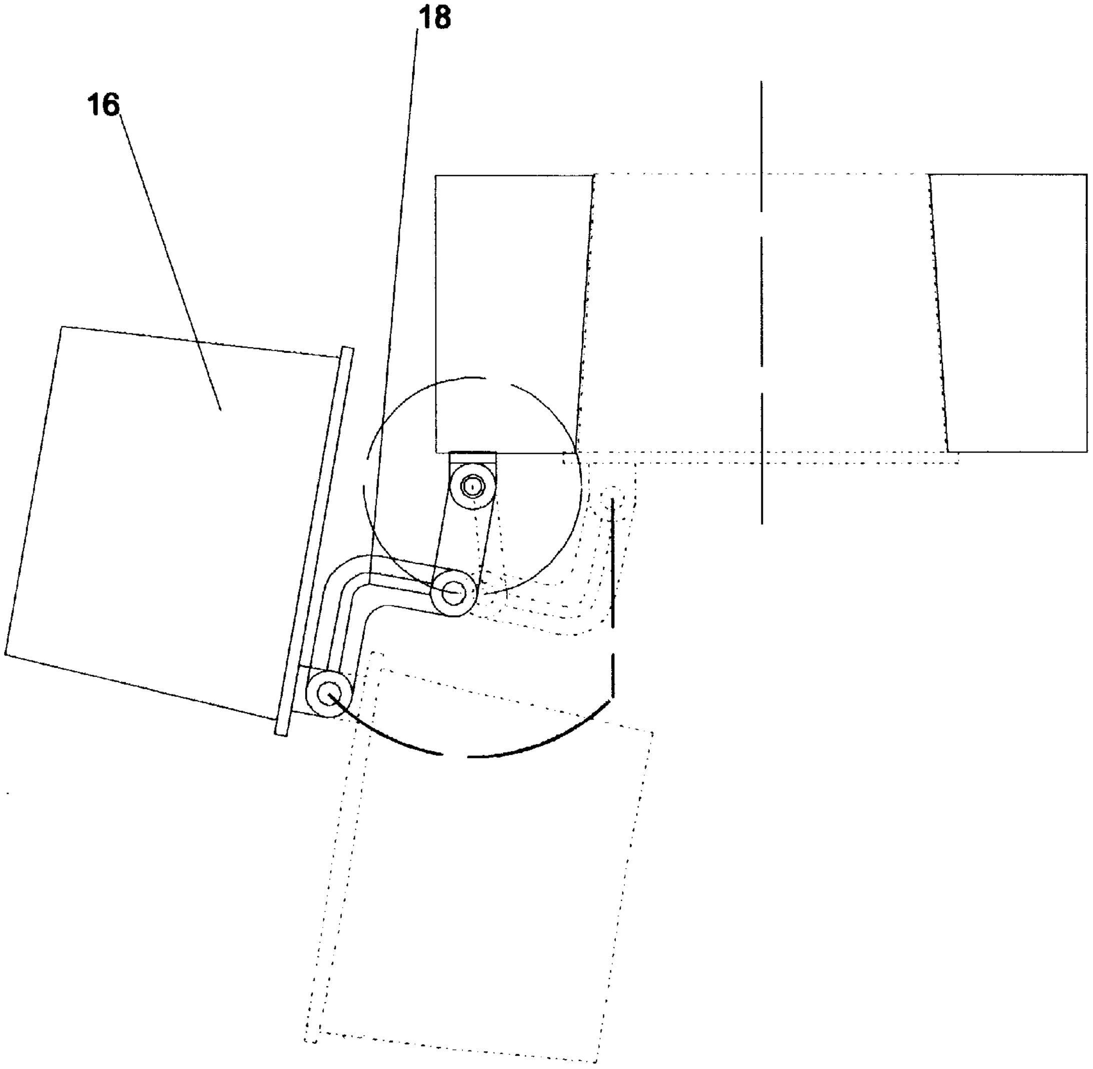
FIG. 15 is an overhead view showing the opening path of the safe door.

Referring first to FIG. 10, the present invention is a magnetic vacuum oven 10. The magnetic vacuum oven 10 comprises a steel magnet core 12 that includes a door means, a "safe door" 16. While the oven 10 is in an operating mode, access to the interior of the oven 10 is provided by the safe door 16, shown in detail in FIG. 14. The safe door 16 is mounted on the core 12 by means of an articulated hinge 18.

Since the door 16 is part of the magnetic circuit, great care must be taken to ensure a tight fit and to resist the considerable magnetic forces attracting the door to the opposite air gap face. This has been done in the present invention by both tapering and stepping the access door, much like a safe door.

The door 16 comprises as a chief component a door block 161 received in a door opening in the core 12. The door block 161 includes an outer section 1611 and an inner section 1612. The outer and inner sections 1611, 1612 are reduced in size in a step-wise fashion, and both sections are tapered toward the interior. The door opening includes an outer section and an inner section so that the door opening conforms in shape to the door 16 to provide an effective sealing area.

Both the door sections 1611, 1612 are essentially rectangular in cross section, with rounded corners. The outer face of each section has the largest area of the surfaces of the section. Defining the outer surface of the door block as the x-y plane, the sections are tapered in the x and y directions along the z-axis from the outer face of each of the sections. The outer face of the inner section 1612 is smaller in size than, but is coincident with, the inner face of the outer section 1611. The inner section 1612 projects inward from the inner face of the outer section 1611. This results in each door section forming a plug shaped body. The door opening 162 conforms geometrically to the door 16. The step-wise reduction in size of the sections allows the user to take advantage of multiple sealing joints to ensure complete integrity of the door block/door opening seal.

The inner surface of the door 16 is covered by a pole piece 163. The outer surface of the door 16 is covered by a face plate 164. Mounted on the face plate 164 are a pull handle 165 and a latching means 166. The pull handle 165 allows the user to easily open the door 16 when the latching means 166 is in a released position.

Weight is a problem in the present invention since for a one cubic foot air gap, the core door will weigh about 500 lbs. In the preferred embodiment, a double articulated hinge mechanism has been used which handles this weight nicely. Those skilled in the art will recognize that a rail-guided pneumatic, hydraulic, electrical, or mechanical operated mechanism could also be used to operate the door 16.

A door hinge mount 181 is also affixed to the face plate 164. The door hinge mount 181 includes two pairs of bosses 1811. Each boss 1811 includes a central through hole 1812.

Affixed to the door hinge mount 181 is a curved hinge element 182. Each end of the curved hinge element 182 includes single bosses 1821. The bosses 1821 each include a central through hole 1822. The bosses 1821 on an inner end of the curved hinge element 182 are positioned to fit between the boss pairs 1811 on the door hinge mount 181. The curved element 182 is thereby easily secured in the door hinge mount 181 by means of a first hinge pin 183.

The bosses 1821 on an outer end of the curved hinge element 182 are positioned to be received in openings 1841 in an inner end of a linear hinge element 184. The inner end of the linear hinge element 184 includes a central through way 1842. A second hinge pin 183 that passes through the through way 1842 secures the outer end of the curved hinge element 182 to the inner end of the linear hinge element 184.

An outer end of the linear hinge element 184 includes spaced bosses 1843 that are received in boss pairs 1851 on a hinge mount 185. Each of the bosses 1851 includes a central through hole 1852 that receives a third hinge pin 183 to secure the outer end of the linear hinge element 184 to the core 12.

The unique structure of the articulated hinge arm 18 allows the door 16 to swing completely away from the core 12 to allow complete access, through the door opening 162, to a central chamber 20. Without the articulated hinge arm 18, a door with the necessary thickness would not be able to clear the door opening, and access to the central chamber would be limited.

Figure 12:
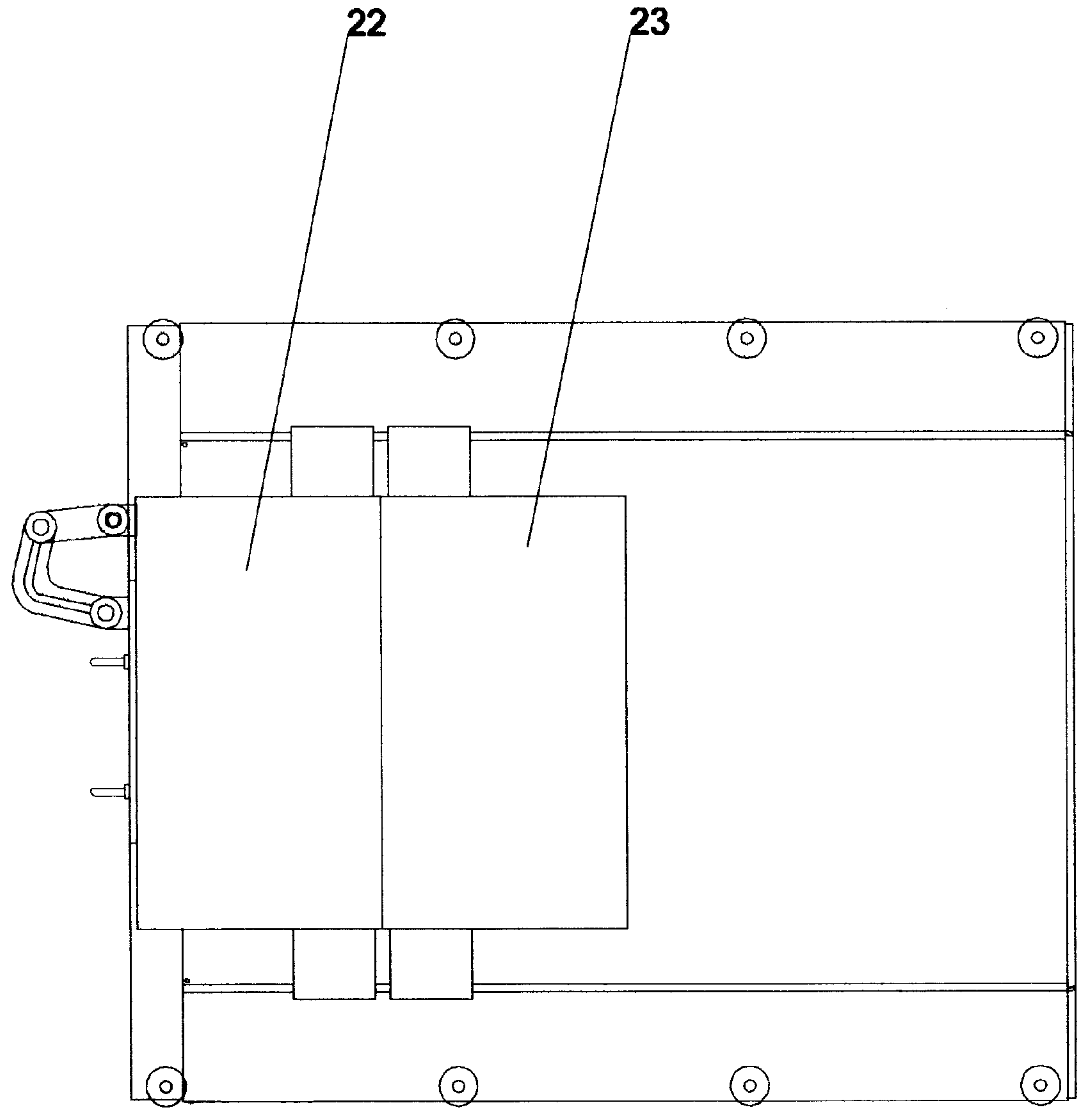
FIG. 12 is a top view of the magnetic vacuum oven.
Figure 13:
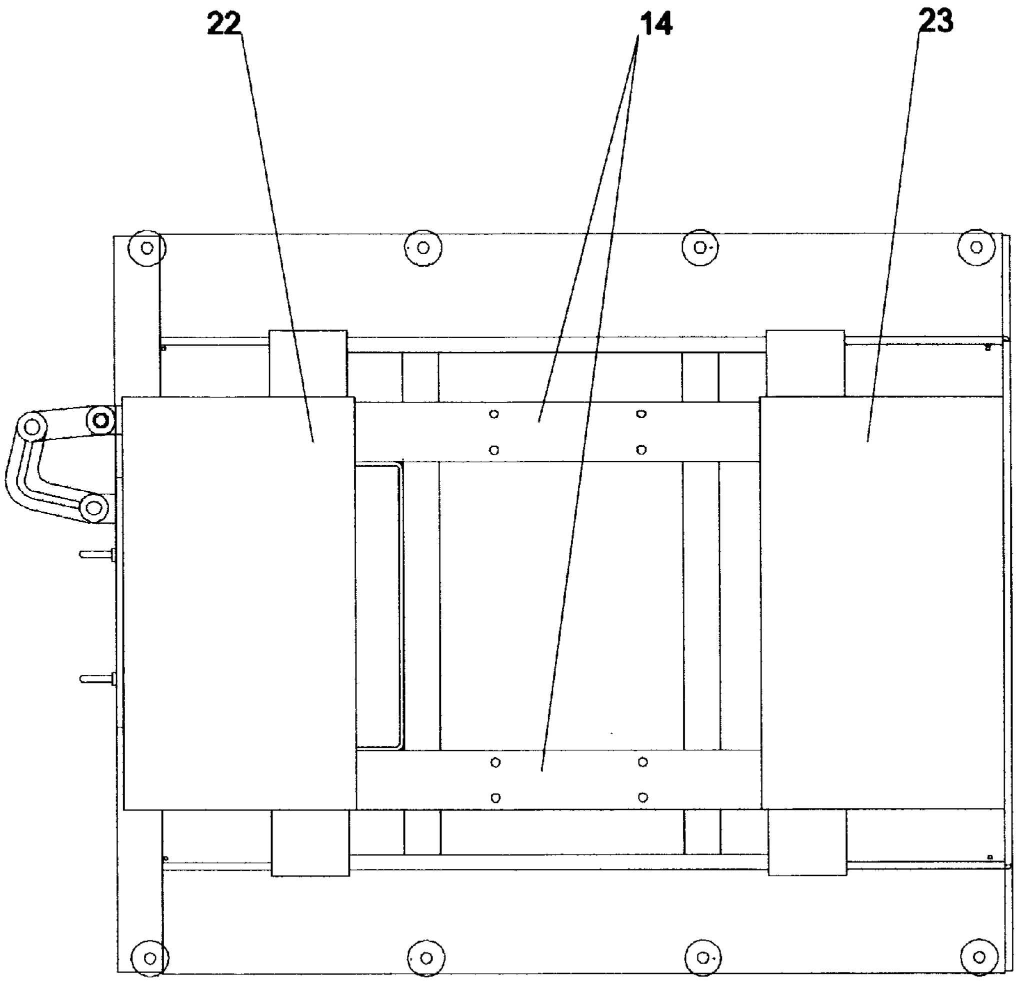
FIG. 13 is a top view of the magnetic vacuum oven with the electromagnetic elements separated for access to the central chamber.

A powerful electromagnet comprising two powerful electromagnetic elements 22, 23 are mounted so as to surround the central chamber 20. A first electromagnet element 22 is mounted on a front side, and a second electromagnet element 23 is mounted on a rear side of the oven. The rear electromagnet element 23 is mounted on a pair of slide rails 14. The rails 14 allow the rear electromagnet element 23 to be moved away from front electromagnet element 22 for access to the interior of the oven 10. (See FIGS. 12 and 13.) Utilizing movable electromagnetic elements 22, 23 that can be separated in such a fashion greatly eases maintenance of the oven 10. The means of providing movable mountings that slide away from each other to provide internal access is known in the art. Thus, the mechanism of the magnetic vacuum oven of the present invention that accomplishes the separation motion of the two electromagnetic elements is not described in detail herein.

Figure 16:
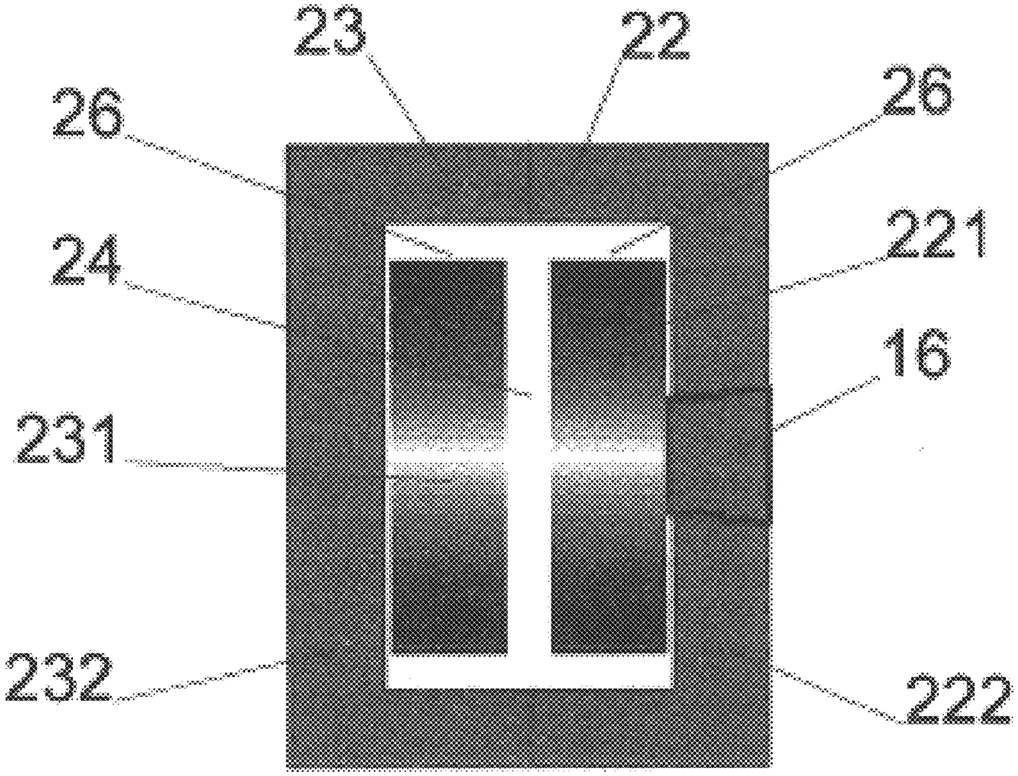
FIG. 16 is a side view of the electromagnetic elements.

The electromagnetic elements 22, 23 are shown in side view in FIG. 16. Each electromagnet element 22, 23 comprises a coil 221, 231 and a core 222, 232. As has been described above, the door 16 actually forms a part of the core 222 of the front electromagnet element 22. Access is thus provided through the door 16 directly into the central chamber 20.

Although the central chamber 20 can be constructed to any size desired by the user, in the preferred embodiment the central chamber approximates a twelve by twelve by twelve inch cubic space. This provides sufficient space to easily load and unload the test wafers that are being processed in the oven.

The coils 221, 231 are essentially rectangular, as illustrated in FIGS. 17*a–c*. Each coil element 221, 231 includes four double pancake copper coils bound in an epoxy base to affix them in their proper positions. In the preferred embodiment, the two coils 221, 231 are separated by a thin air gap 24 to achieve vacuum pump/instrumentation access. The air gap measures a nominal one inch at the magnet mid-plane. A vacuum is achieved by pumping air through the air gap 24 and through 1×~12 inch headers 26 above each coil 221,231. Heater power/cooling and instrumentation lines for the usual oven functions can be routed in the interior of the headers 26 or through the chamber top or bottom. Vacuums of $10^{-7}$ torr have been achieved in a one cubic foot vacuum oven chamber 20.

Center line separation (the air gap 24) of the coils 221, 231 does introduce some magnetic field perturbation. This is of little consequence, however, since the vacuum oven chamber wall, cooling lines and/or insulation, internal heat shields, etc., take up almost all of the region effected. Flux line angular deviations have been measured as less than 0.2°. If desired by the user, an increase in current density of that section of the coils 221, 231 nearest the magnet center line would improve this flux line angular deviation and/or permit greater coil center-line separations.

Stray fields are extremely low since the coils 221, 231 confine the air gap flux almost completely. This has proven quite important since vacuum instrumentation, computer monitors, vacuum pumps and other devices can be effected by fields as low as 1 gauss. The modest external fields generated by the protruding coils are shielded with steel sheet metal covers (field clamps). External fields quickly drop off from a maximum strength of 5 gauss with distance from the magnet.

In order to simplify the power supply, the coil elements 221, 231 are in electrical contact with each other by means of a flexible connection band so that the machine requires only a single power input line. With an electrical power supply of 2200 amps, 300 kilowatts, the electromagnetic element 22 provides a magnetic field of 21.5 KGauss.

This type of power consumption by necessity generates a large amount of heat. In order to keep the coils at a stable temperature, water is piped through hollow channels 24 in the coils 221, 231. Each of the pancake coils that form the coils 221, 231 includes a water circuit, so that there is a total of sixteen water circuits in the coil elements 221, 231.

The above disclosure is not intended as limiting. Those skilled in the art will readily observe that numerous modifications and alterations of the device may be made while retaining the teachings of the invention. Accordingly, the above disclosure should be construed as limited only by the restrictions of the appended claims.

I claim:

1. A magnetic vacuum oven comprising:

heating means to heat an interior of said oven, means to create a vacuum in said interior of said oven, a central chamber to receive workpieces, an electromagnet that provides a magnetic field to said central chamber; wherein said electromagnet includes a central area that comprises said central chamber, a door providing direct access to said central chamber, said door is a part of a core of said electromagnet.

2. The magnetic vacuum oven of claim 1 wherein:

said door comprises a door block received in a door opening in said core, said door block includes an outer section and an inner section, said outer and inner sections are reduced in size in a step-wise fashion from an outer end of said door block to an inner end of said door block, and both of said sections are tapered toward said interior of said oven, said door opening includes an outer section and an inner section, and said door opening conforms in shape to said door block to provide an effective sealing area and to resist a magnetic force of said electromagnet.

3. The magnetic vacuum oven of claim 2 wherein:

said door sections are essentially rectangular in cross section with rounded corners, and defining an outer surface of said door block as the x-y plane, said sections are tapered in the x and y directions along the z-axis from an outer face of each of the sections, and an outer face of said inner section is smaller in size than an inner face of said outer section, said inner section projects inward from said inner face of said outer section, step-wise reduction in size of said sections providing multiple sealing joints to ensure complete integrity of a door block/door opening seal.

4. The magnetic vacuum oven of claim 1 wherein:

said electromagnet comprises two electromagnetic elements that surround said central chamber, a first electromagnet element is mounted on a front side of said central chamber, and a second electromagnet element is mounted on a rear side of said central chamber.

5. The magnetic vacuum oven of claim 4 wherein:

one of said electromagnet elements is mounted on slide rails, said slide rails allow said electromagnet element mounted on said slide rails to be moved to provide access to said interior of said oven.

6. The magnetic vacuum oven of claim 4 wherein:

each said electromagnet element comprises a coil and a core element, said coils are substantially rectangular in shape, with rounded outer corners, said coils are separated by a thin air gap, and an open space header is provided at top and bottom sides between said coils and said core elements, said core elements comprise a rectangular enclosure around said coils, such that said coils are completely enclosed by said core elements.

7. The magnetic vacuum oven of claim 1 wherein:

said coils are cooled by interior water channels.

8. The magnetic vacuum oven of claim 1 wherein:

said cores are connected by an electrically conductive member so that both said cores are powered by a single power supply.

9. A magnetic vacuum oven comprising:

heating means to heat an interior of said oven, means to create a vacuum in said interior of said oven, a central chamber to receive workpieces, an electromagnet that provides a magnetic field to said central chamber; wherein said electromagnet includes a central area that comprises said central chamber, a door providing direct access to said central chamber, said door is a part of a core of said electromagnet, said door comprises a door block received in a door opening in said core, said door block includes an outer section and an inner section, said outer and inner sections are reduced in size in a step-wise fashion from an outer end of said door block to an inner end of said door block, and both of said sections are tapered toward said interior of said oven, said door opening includes an outer section and an inner section, and said door opening conforms in shape to said door block to provide an effective sealing area and to resist a magnetic force of said electromagnet.

10. The magnetic vacuum oven of claim 9 wherein:

said door sections are essentially rectangular in cross section with rounded corners, and defining an outer surface of said door block as the x-y plane, said sections are tapered in the x and y directions along the z-axis from an outer face of each of the sections, and an outer face of said inner section is smaller in size than an inner face of said outer section, said inner section projects inward from said inner face of said outer section, step-wise reduction in size of said sections providing multiple sealing joints to ensure complete integrity of a door block/door opening seal.

11. The magnetic vacuum oven of claim 9 wherein:

said electromagnet comprises two electromagnetic elements that surround said central chamber, a first electromagnet element is mounted on a front side of said central chamber, and a second electromagnet element is mounted on a rear side of said central chamber.

12. The magnetic vacuum oven of claim 11 wherein:

one of said electromagnet elements is mounted on slide rails, said slide rails allow said electromagnet element mounted on said slide rails to be moved to provide access to said interior of said oven.

13. The magnetic vacuum oven of claim 11 wherein:

each said electromagnet element comprises a coil and a core element, said coils are substantially rectangular in shape, with rounded outer corners, said coils are separated by a thin air gap, and an open space header is provided at top and bottom sides between said coils and said core elements, said core elements comprise a rectangular enclosure around said coils, such that said coils are completely enclosed by said core elements.

14. The magnetic vacuum oven of claim 9 wherein:

said coils are cooled by interior water channels.

15. The magnetic vacuum oven of claim 9 wherein:

said cores are connected by an electrically conductive member so that both said cores are powered by a single power supply.

16. A magnetic vacuum oven comprising:

heating means to heat an interior of said oven, means to create a vacuum in said interior of said oven, a central chamber to receive workpieces, an electromagnet that provides a magnetic field to said central chamber; wherein said electromagnet includes a central area that comprises said central chamber, a door providing direct access to said central chamber, said door is a part of a core of said electromagnet, said electromagnet comprises two electromagnetic elements that surround said central chamber, a first electromagnet element is mounted on a front side of said central chamber, and a second electromagnet element is mounted on a rear side of said central chamber.

17. The magnetic vacuum oven of claim 16 wherein:

one of said electromagnet elements is mounted on slide rails, said slide rails allow said electromagnet element mounted on said slide rails to be moved to provide access to said interior of said oven.

18. The magnetic vacuum oven of claim 16 wherein:

each said electromagnet element comprises a coil and a core element, said coils are substantially rectangular in shape, with rounded outer corners, said coils are separated by a thin air gap, and an open space header is provided at top and bottom sides between said coils and said core elements, said core elements comprise a rectangular enclosure around said coils, such that said coils are completely enclosed by said core elements.

19. The magnetic vacuum oven of claim 16 wherein:

said coils are cooled by interior water channels.

20. The magnetic vacuum oven of claim 16 wherein:

said cores are connected by an electrically conductive member so that both said cores are powered by a single power supply.

* * * * *